(12) United States Patent
Sugasaki (10) Patent No.: US 8,346,852 B2
(45) Date of Patent: Jan. 1, 2013

(54) APPARATUS AND METHOD FOR UPDATING DISPLAYED WEB PAGE

(75) Inventor: Daichi Sugasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 313 days.

(21) Appl. No.: 12/622,555

(22) Filed: Nov. 20, 2009

(65) Prior Publication Data

US 2010/0131595 A1 May 27, 2010

(30) Foreign Application Priority Data

Nov. 27, 2008 (JP) ................................. 2008-302904

(51) Int. Cl.
*G06F 15/16* (2006.01)

(52) U.S. Cl. ........ 709/203; 709/201; 709/204; 715/203; 705/63

(58) Field of Classification Search .......... 709/201–204; 715/203; 705/14, 63
See application file for complete search history.

(56) References Cited

U.S. PATENT DOCUMENTS

| | | | |
|---|---|---|---|
| 6,480,883 B1 | 11/2002 | Tsutsumitake | |
| 6,493,434 B1 * | 12/2002 | Desmond et al. ........... | 379/88.17 |
| 7,080,122 B2 * | 7/2006 | Bilbrey et al. ............... | 709/206 |
| 7,130,879 B1 * | 10/2006 | Dayon ........................... | 709/203 |
| 7,228,499 B1 * | 6/2007 | Taira ............................. | 715/207 |
| 7,383,320 B1 * | 6/2008 | Silberstein et al. .......... | 709/219 |
| 7,397,476 B2 | 7/2008 | Akaiwa et al. | |
| 7,707,242 B2 * | 4/2010 | DiMichele et al. ........... | 709/203 |
| 8,219,902 B2 * | 7/2012 | Farrell et al. ................. | 715/234 |
| 2002/0016819 A1 * | 2/2002 | Sugimoto et al. ............ | 709/203 |
| 2003/0084099 A1 * | 5/2003 | Kamine ......................... | 709/203 |
| 2003/0140089 A1 * | 7/2003 | Hines et al. ................... | 709/202 |
| 2003/0177175 A1 * | 9/2003 | Worley et al. ................. | 709/203 |
| 2004/0044679 A1 * | 3/2004 | Chang et al. .................. | 707/102 |
| 2005/0102611 A1 * | 5/2005 | Chen ............................. | 715/513 |
| 2005/0119910 A1 * | 6/2005 | Schneider ........................ | 705/1 |
| 2007/0055694 A1 * | 3/2007 | Ruge et al. ................ | 707/104.1 |
| 2007/0061856 A1 * | 3/2007 | Seki et al. ..................... | 725/105 |
| 2007/0078810 A1 * | 4/2007 | Hackworth ....................... | 707/2 |
| 2008/0148161 A1 * | 6/2008 | Hebert et al. ................. | 715/760 |
| 2008/0207232 A1 * | 8/2008 | Rice et al. ..................... | 455/466 |
| 2009/0049120 A1 * | 2/2009 | Sakairi et al. ................. | 709/203 |
| 2009/0070413 A1 * | 3/2009 | Priyadarshan et al. ....... | 709/203 |

FOREIGN PATENT DOCUMENTS

| | | |
|---|---|---|
| JP | 2000-020423 | 1/2000 |
| JP | 2004-110113 | 4/2004 |
| JP | 2008-090285 | 4/2008 |
| JP | 2008-131388 | 6/2008 |
| JP | 2008-282311 | 11/2008 |

* cited by examiner

*Primary Examiner* — Wing F Chan
*Assistant Examiner* — Razu Miah
(74) *Attorney, Agent, or Firm* — IPUSA, PLLC (57) ABSTRACT

An information processing apparatus includes a Web-page display unit configured to receive a Web page from a Web page server unit to display the received Web page on a display device, an update request wait unit configured to wait for receipt of an update request to update the displayed Web page, and an update request reporting unit configured to report the update request to the Web page display unit in response to receipt of the update request by the update request wait unit from the Web server unit, wherein the Web page display unit is further configured to send a Web page transmission request to the Web server unit based on a definition provided in the displayed Web page in response to the reported update request, and to display on the display device the Web page returned from the Web server unit in response to the Web page transmission request.

6 Claims, 5 Drawing Sheets

APPARATUS AND METHOD FOR UPDATING DISPLAYED WEB PAGE

CROSS-REFERENCE TO RELATED APPLICATIONS

The present application is based on Japanese priority application No. 2008-302904 filed on Nov. 27, 2008, with the Japanese Patent Office, the entire contents of which are hereby incorporated by reference.

BACKGROUND OF THE INVENTION

1. Field of the Invention

The disclosures herein generally relate to information processing apparatuses, Web page updating methods, and recording media having a program embedded therein, and particularly relate to an information processing apparatus for displaying a Web page, a Web page updating method, and a recording medium having a program embedded therein.

2. Description of the Related Art

Typical Web systems employ HTTP (HyperText Transfer Protocol) as a communication protocol used between a Web browser and a Web server (i.e., HTTP server). In HTTP, communication is initiated by the Web browser. Namely, one HTTP communication is comprised of an HTTP request issued by the Web browser and an HTTP response returned by the Web server in response to the HTTP request. Because of this, it is difficult to change what is displayed by the Web browser in response to an event occurring at the Web server asynchronously from any HTTP request.

Communication that is asynchronous from an HTTP request is achieved by use of a technology such as Ajax (i.e., Asynchronous Java (registered trademark) Script+XML).

In the case of a Web browser embedded in an embedded device such as an image forming apparatus, an advanced technology such as Ajax may not be available due to limitation to its functions. According to the technologies disclosed in Patent Documents listed below, further, the Web browser is required to have a dedicated network communication unit for the purpose of asynchronously redrawing a display image. However, it is extremely difficult to add a new function to a Web browser embedded in an embedded device, especially in the case of another company's Web browser. In an environment in which Ajax or the technologies disclosed in Patent Documents listed below are not available, thus, a displayed image on the Web browser side may not be asynchronously updated.

Accordingly, there is a need for an information processing apparatus, a Web page updating method, and a recording medium having a program embodied therein for updating a display state on the Web browser side asynchronously from a request from the Web browser.

[Patent Document 1] Japanese Patent Application Publication No. 2008-131388

[Patent Document 2] Japanese Patent Application Publication No. 2000-020423

[Patent Document 3] Japanese Patent Application Publication No. 2004-110113

SUMMARY OF THE INVENTION

It is a general object of at least one embodiment of the present invention to provide a scheme that substantially eliminates one or more problems caused by the limitations and disadvantages of the related art.

In one embodiment, an information processing apparatus includes a Web-page display unit configured to receive a Web page from a Web page server unit to display the received Web page on a display device, an update request wait unit configured to wait for receipt of an update request to update the displayed Web page, and an update request reporting unit configured to report the update request to the Web page display unit in response to receipt of the update request by the update request wait unit from the Web server unit, wherein the Web page display unit is further configured to send a Web page transmission request to the Web server unit based on a definition provided in the displayed Web page in response to the reported update request, and to display on the display device the Web page returned from the Web server unit in response to the Web page transmission request.

According to at least one embodiment, a display state on the Web browser side may properly be updated asynchronously from a request issued at the Web browser side.

BRIEF DESCRIPTION OF THE DRAWINGS

Other objects and further features of embodiments will be apparent from the following detailed description when read in conjunction with the accompanying drawings: in which.

DESCRIPTION OF THE PREFERRED EMBODIMENTS

Figure 1:
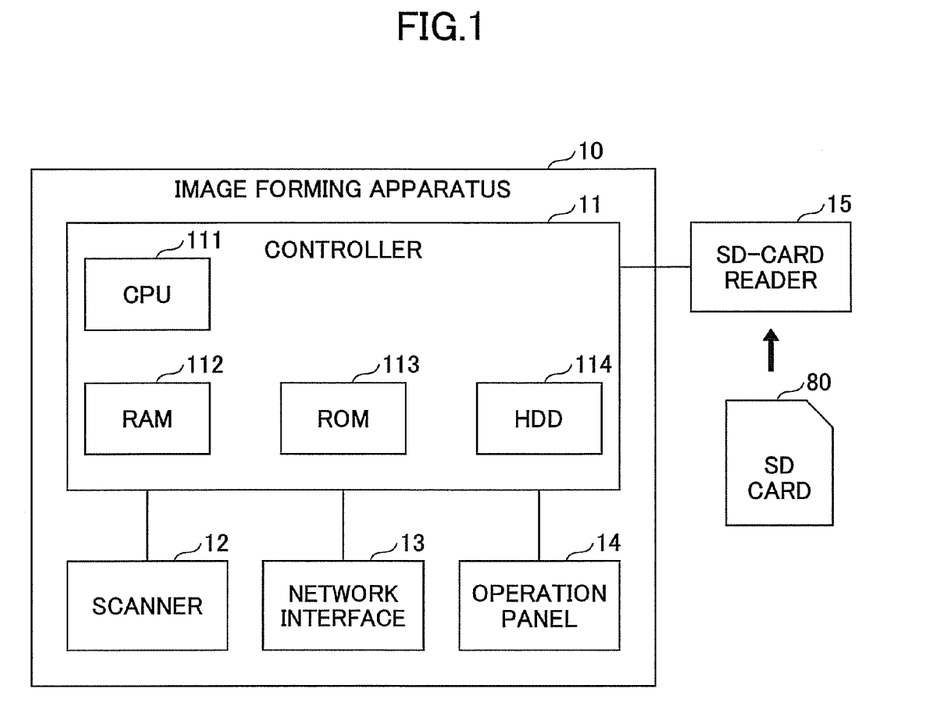
FIG. 1 is a drawing showing an example of the hardware configuration of an image forming apparatus according to the present embodiment.

In the following, embodiments of the present invention will be described with reference to the accompanying drawings. These embodiments will be described by using an image forming apparatus as an example of an information processing apparatus. FIG. 1 is a drawing showing an example of the hardware configuration of an image forming apparatus according to the present embodiment. In FIG. 1, an image forming apparatus 10 is a scanner apparatus, and includes hardware components such as a controller 11, a scanner 12, a network interface 13, and an operation panel 14.

The controller 11 includes a CPU 111, a RAM 112, a ROM 113, and an HDD 114. The ROM 113 stores therein various programs and data used by these programs, for example. The RAM 112 is used as a memory area to which programs are loaded, and is also used as a work area used by the loaded programs. The CPU 111 executes programs loaded to the RAM 112 to provide various functions. The HDD 114 stores therein scanned image data or the like.

The scanner 12 is the hardware for scanning image data from a document. The network interface 13 is the hardware for establishing connection with a network (either wired or wireless) such as a LAN (Local Area Network). The operation panel 14 is the hardware having a liquid crystal display panel (i.e., display device) for providing information to a user and buttons for receiving user inputs.

The image forming apparatus 10 is connected to an SD-card reader 15 via a USB (Universal Serial Bus) cable or the like. The SD-card reader 15 is used to read a program recorded in an SD card 80. In the image forming apparatus 10, not only a program stored in the ROM 113 but also a program stored in the SD card 80 is loaded to the RAM 112 for execution. The SD-card reader 15 may alternatively be embedded in the image forming apparatus 10.

Figure 2:
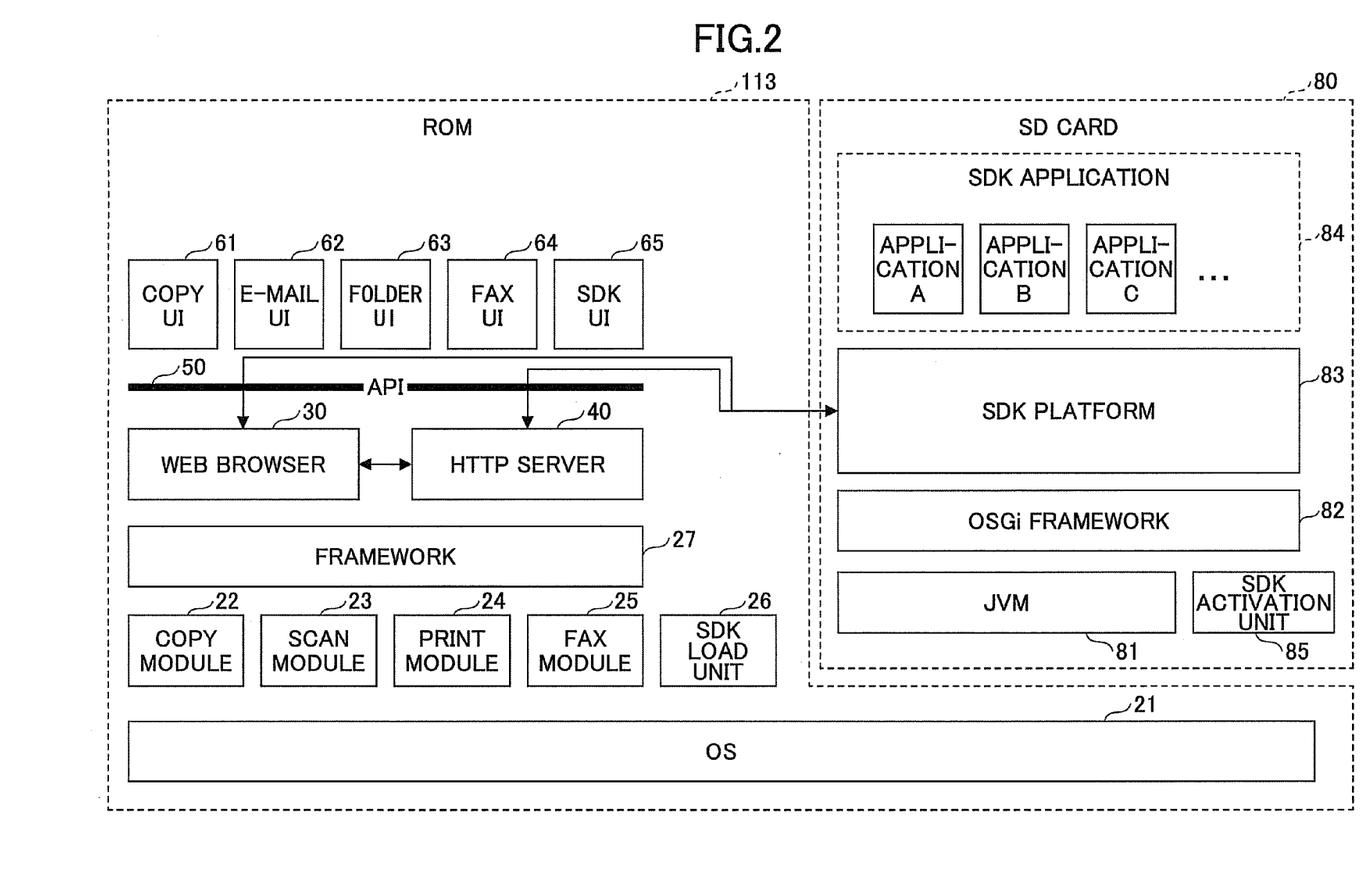
FIG. 2 is a drawing showing an example of a software configuration used in the image forming apparatus according to the present embodiment.

FIG. 2 is a drawing showing an example of a software configuration used in the image forming apparatus according to the present embodiment. Positional relationships between programs illustrated in FIG. 2 shows the relationships between the programs loaded to the RAM 112 from the ROM 113 or from the SD card 80.

The SD card 80 stores a JVM 81, an OSGi framework 82, an SDK platform 83, an SDK application 84, an SDK activation unit 85, and so on.

The JVM 81 is a Java (registered trademark) virtual machine. The JVM 81 converts byte codes specific to the Java (registered trademark) language into a native code that is executable on the OS 21, and executes the converted code. Software components in layers illustrated closer to the top margin of the drawing than the JVM 81 are implemented by use of the byte codes specific to Java.

The OSGi framework 82 is a software platform that provides an environment in which software components created based on a Java-language-based open software component technology are executed, which is a standard technology provided by the OSGi (Open Services Gateway Initiative) alliance. On the OSGi framework 82, a Java-language software is implemented as a software component referred to as "bundle". A single bundle is comprised of a single JAR (Java Archive) file. Each bundle can be installed independently and dynamically, so that there is no need to reboot the apparatus.

The SDK application 84 is an application program (SDK API) implemented by use of an API (Application Program Interface) provided by a dedicated SDK (i.e., software developing kit). In FIG. 2, the SDK application 84 includes an application A, an application B, an application C, and so on.

The SDK platform 83 is a software platform that provides an operating environment for the SDK application 84 through SDK API. SDK API is open to the public. Accordingly, a third party or the like may be able to implement the SDK application 84.

The SDK activation unit 85 loads a program stored in the SD card 80 to the RAM 112 to execute the program.

The ROM 113 of the image forming apparatus 10 stores therein a copy module 22, a scan module 23, a print module 24, a FAX module 25, an SDK load unit 26, a framework 27, a Web browser 30, an HTTP server 40, an API 50, a copy UI 61, an E-mail UI 62, a folder UI 63, a FAX UI 64, and an SDK UI 65, for example.

The OS 21 is an operating system. The copy module 22 is a program module for controlling the copying of image data. The scan module 23 is a program module for controlling the scanning of image data. The print module 24 is a program module for controlling the printing of image data. The FAX module 25 is a program module for controlling the facsimile transmission of image data.

The SDK load unit 26 is called in response to an activation of the image forming apparatus 10. The SDK load unit 26 is configured to mount the SD card 80, to load the SDK activation unit 85 to the RAM 112, and to execute the SDK activation unit 85, for example. The framework 27 provides an operating environment for programs used in the image forming apparatus 10. The Web browser 30 is used to control the displayed content of the operation panel 14. The operation panel 14 displays HTML (HyperText Markup Language) data (i.e., Web pages) inclusive of script programs such as Javascripts as various types of operation screens. The HTTP server 40 controls a process performed in response to a request (i.e., HTTP request) from the Web browser 30, and returns a response (i.e., HTTP response) to the Web browser 30.

The API 50 is an API (Application Program Interface) stored in the ROM 113 for use for each program.

The copy UI 61, the E-mail UI 62, the folder UI 63, the FAX UI 64, and the SDK UI 65 are HTML data for the purpose of displaying various operation screens. The copy UI 61 is the HTML data for displaying an operation screen for use in copying scanned image data. The E-mail UI 62 is the HTML data for displaying an operation screen for use in transmitting scanned image data via email. The folder UI 63 is the HTML data for displaying an operation screen for use in storing scanned image data in folders of the file system. The FAX UI 64 is the HTML data for displaying an operation screen for use in transmitting scanned image data via facsimile. Switching between displayed UIs (i.e., HTML data) is performed on the operation panel 14 by use of hard keys provided in one-to-one correspondence to the UIs. For example, when a hard key corresponding to the copy UI 61 is pressed, this event is reported to the Web browser 30. The Web browser 30 transmits an HTTP request inclusive of a URL corresponding to this event to the HTTP server 40. The HTTP server 40 acquires the copy UI 61 corresponding to this URL, and returns the acquired copy UI 61 to the Web browser 30. The Web browser 30 displays the returned copy UI 61.

Although the image forming apparatus 10 of the present embodiment is a scanner apparatus, program modules or UIs for functions than cannot be achieved by a scanner apparatus alone, e.g., a copy function, a print function, a facsimile transmission function, and so on, are provided. Such provision is made by taking into account the possibility that the image forming apparatus 10 may be coupled to a printer, a facsimile device, and so on via a USB cable or the like for functional extension.

The Web browser 30 also displays the HTML data for an operation screen of the SDK application 84. A hard key corresponding to the SDK UI 65 on the operation panel 14 is pressed to cause the Web browser 30 to display the SDK UI 65. In response to the displaying of the SDK UI 65, a script program contained in the SDK UI 65 is executed. The Web browser 30 transmits an HTTP request inclusive of a URL specified in the script program to the SDK platform 83. Namely, the SDK platform 83 is provided with a function equivalent to the function of an HTTP server. The HTTP server included in the SDK platform 83 has a different port number than the port number of the HTTP server 40. The URL specified in the script program of the SDK UI 65 includes the port number of the HTTP server of the SDK platform 83. Accordingly, the HTTP request inclusive of this URL is not received by the HTTP server 40.

Upon receiving the HTTP request from the Web browser 30, the SDK platform 83 performs a process conforming to the URL included in the HTTP request to generate HTML data for displaying a screen listing the SDK applications 84 or HTML data for displaying an operation screen used in operating one of the SDK applications 84, for example. The SDK platform 83 then returns an HTTP response including the generated HTML data to the Web browser 30. The Web browser 30 displays the HTML data in response to the receipt of the HTTP response. As a result, an operation screen for the SDK application 84 is displayed on the operation panel 14.

The HTML data for displaying an operation screen for the SDK application 84 is designed to cause an HTTP request to be transmitted to the SDK platform 83 in response to an operation performed on the operation screen. Unless a hard key corresponding to another UI is pressed, an HTTP request responsive to a subsequent operation is transmitted to the SDK platform 83, so that HTML data is returned to the Web browser 30 as a result of a process performed by the SDK platform 83 or the SDK application 84. In this manner, a transition occurs with respect to operation screens relating to the SDK application 84.

In the display control utilizing the Web browser 30 as described above, generally, the display state of the operation panel 14 is not updated unless the Web browser 30 issues a request (i.e., HTTP request). In the present embodiment, as will be described, provision is made such that the display state of the operation panel 14 may be updated at any timing chosen by the server (i.e., SDK platform 83 or the SDK application 84) in the display control utilizing the Web browser 30.

Figure 3:
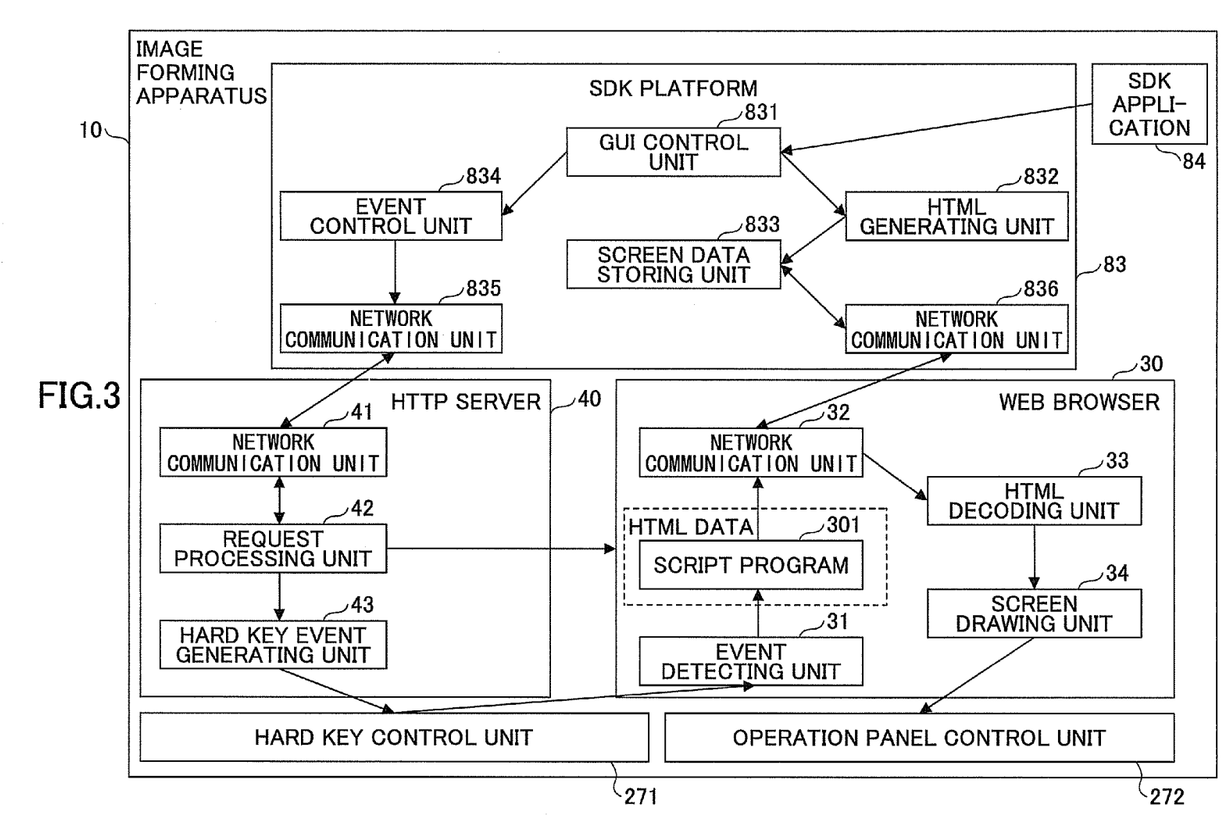
FIG. 3 is a drawing showing an example of a functional configuration relating to display control in the image forming apparatus according to the present embodiment.

FIG. 3 is a drawing showing an example of a functional configuration relating to display control in the image forming apparatus according to the present embodiment.

In FIG. 3, the SDK application 84, the SDK platform 83, the HTTP server 40, and the Web browser shown in FIG. 2 are selectively illustrated, together with a hard key control unit 271 and an operation panel control unit 272.

In FIG. 3, the SDK platform 83 includes a GUI control unit 831, an HTML generating unit 832, a screen data storing unit 833, an event control unit 834, a network communication unit 835, and a network communication unit 836.

The GUI control unit 831 controls processes for generating and redrawing (updating) an operation screen in response to a request from the SDK application 84. The HTML generating unit 832 generates HTML data for displaying an operation screen in response to a request from the GUI control unit 831. The screen data storing unit 833 is a memory area in which the HTML data generated by the HTML generating unit 832 and image data to be displayed on the HTML data or the like are stored. The screen data storing unit 833 may be implemented by use of the HDD 114. The event control unit 834 controls a process responsive to an event reported by the GUI control unit 831 or the like. The network communication unit 835 transmits an HTTP request to the HTTP server 40 to redraw an operation screen based on the control of the event control unit 834.

The network communication unit 836 waits for the receipt of an HTTP request relating to a predetermined port number sent from the Web browser 30. Upon receiving an HTTP request from the Web browser 30, the network communication unit 836 acquires HTML data or the like corresponding to the URL included in this HTTP request from the screen data storing unit 833. The network communication unit 836 then returns the acquired HTML data or the like to the Web browser 30. In this manner, the SDK platform 83 serves as a client for the HTTP server 40, and serves as a server for the Web browser 30.

The HTTP server 40 includes a network communication unit 41, a request processing unit 42, and a hard key event generating unit 43.

The network communication unit 41 waits for the receipt of an HTTP request relating to a predetermined port number (which is different from the port number of the network communication unit 836) sent from the network communication unit 835 of the SDK platform 83. Upon receiving an HTTP request from the network communication unit 835, the network communication unit 41 requests the request processing unit 42 to perform a process responsive to the URL included in this HTTP request. The request processing unit 42 performs the process requested by the network communication unit 41. For example, the request processing unit 42 may transmit a redraw instruction comprised of HTML data to the Web browser 30, or may request the hard key event generating unit 43 to generate a hard key event for causing the operation panel 14 to perform a redraw. This is done by use of an inter-process communication. The inter-process communication is achieved by a relevant function provided in the Web browser 30. The request processing unit 42 may be an application executed on the server side such as a servlet, a CGI (Common Gateway Interface), or a PHP (Hypertext Preprocessor). The hard key event generating unit 43 requests the hard key control unit 271 to generate a redraw event on the operation panel 14 in response to the request from the request processing unit 42.

The hard key control unit 271 is a driver program capable of controlling hard keys on the operation panel 14, and generates a requested hard key event. The hard key control unit 271 is included in the framework 27 illustrated in FIG. 2.

The Web browser 30 includes an event detecting unit 31, a network communication unit 32, an HTML decoding unit 33, and a screen drawing unit 34.

The event detecting unit 31 detects a hard key event, and enters the detected hard key event into a script program 301 of the HTML data that is being displayed by the Web browser 30.

The script program 301 causes the Web browser 30 to perform the programmed process in response to a redraw request sent through an inter-process communication from the request processing unit 42 or in response to a notice of a hard key event sent from the event detecting unit 31. For example, the script program 301 causes the network communication unit 32 to send an HTTP request relating to a URL corresponding to the operation screen (i.e., HTML data) that is to be displayed upon a display transition initiated by a redraw request. It should be noted that the event generated by the hard key control unit 271 is not limited to an event that actually causes a redraw to be performed. All that the hard key control unit 271 does is to generate an event. Whether a redraw is performed on the operation panel in response to the event depends on the definition provided in the script program 301.

The network communication unit 32 transmits a request issued by the script program 301 or an HTTP request based on a hyper link or the like included in the HTML data to the network communication unit 836 of the SDK platform 83. The network communication unit 32 receives HTML data or the like returned in response to such an HTTP request. The HTML decoding unit 33 decodes the HTML data received by the network communication unit 32 to request the screen drawing unit 34 to redraw an operation screen.

In response to the request from the HTML decoding unit 33, the screen drawing unit 34 issues a draw command to the operation panel control unit 272 to draw an operation screen.

In response to the draw command, the operation panel control unit 272 causes the operation panel 14 to display an operation screen (i.e., HTML data). Further, the operation panel control unit 272 serves to notify the Web browser 30 of an input event performed with respect to the operation screen displayed on the operation panel 14. Such an event is detected by the event detecting unit 31 of the Web browser 30. The operation panel control unit 272 is included in the framework 27 illustrated in FIG. 2.

Figure 4:
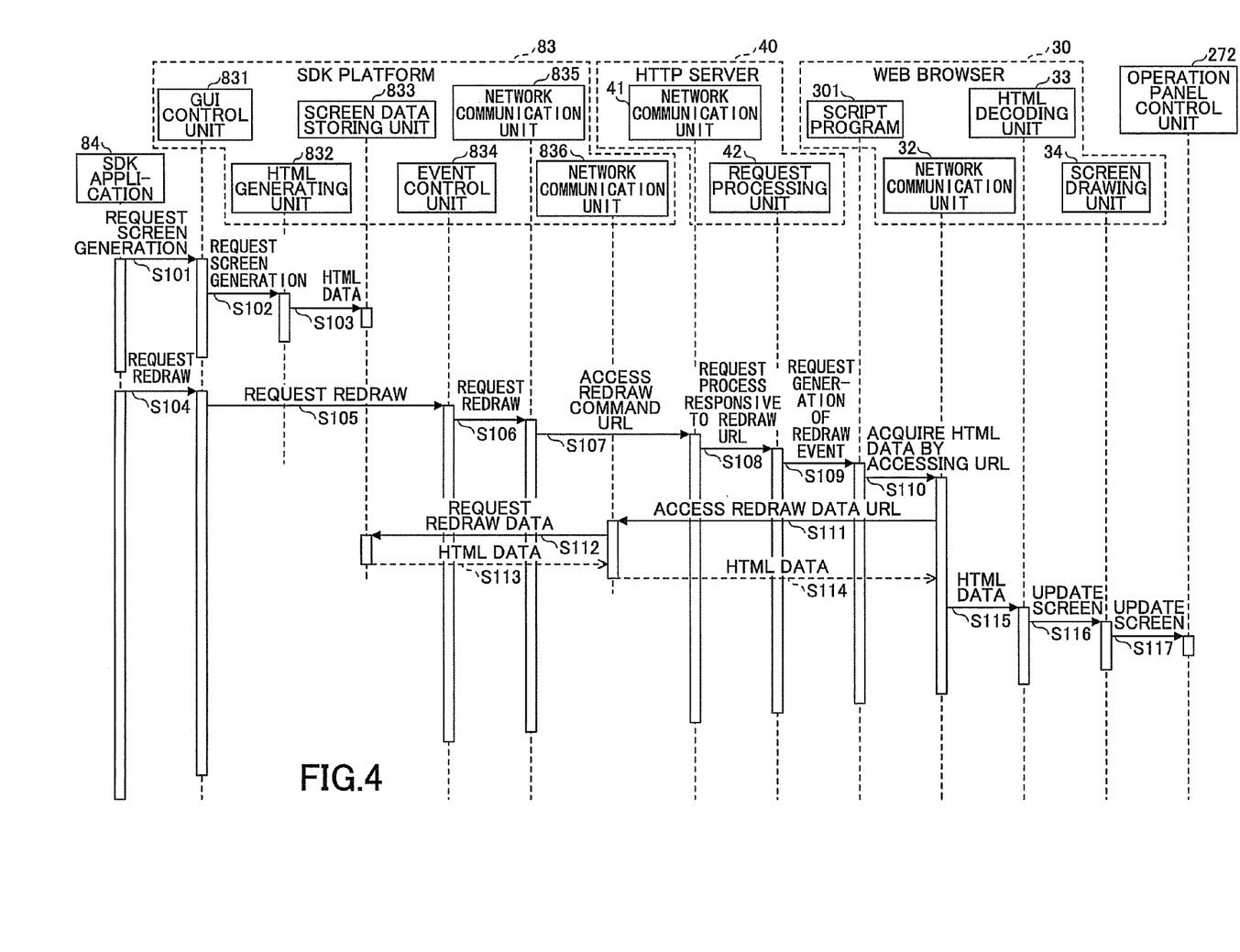
FIG. 4 is a sequence chart illustrating the operation procedure of controlling displaying on an operation screen.

In the following, an operation procedure performed by the image forming apparatus 10 will be described. FIG. 4 is a sequence chart illustrating the operation procedure of controlling displaying on an operation screen.

An update of the operation screen of the operation panel 14 may need to be performed asynchronously from an HTTP request from the Web browser 30 due to occurrence of a predetermined event such as the completion of a requested process or the occurrence of trouble. In such a case, the SDK application 84 issues a request to generate an operation screen corresponding to such an event to the GUI control unit 831 (S101). This generation request may include identification information (hereinafter referred to as "screen identifier") indicative of an operation screen that is to be generated.

The GUI control unit 831 requests the HTML generating unit 832 to generate HTML data for displaying an operation screen corresponding to the screen identifier (S102). The HTML generating unit 832 generates the HTML data corresponding to the screen identifier, and stores the generated HTML data in the screen data storing unit 833 (S103). Alternatively, HTML data may be stored in advance in the ROM 113 or HDD 114 together with a screen identifier assigned thereto, or may be stored in a computer connected through a network. In such a case, the HTML generating unit 832 retrieves the HTML data corresponding to the screen identifier from the storage apparatus, and stores the retrieved HTML data in the screen data storing unit 833.

Upon completing the generation or acquisition of a new operation screen, the SDK application 84 issues a request to redraw an operation screen to the GUI control unit 831 (S104). In response to this redraw request, the GUI control unit 831 supplies a URL (e.g., "http://xxx.xxx.redraw", which is hereinafter referred to as a "redraw command URL") indicative of a command to redraw an operation screen to the event control unit 834 (S105). In response to such a redraw request, the event control unit 834 notifies the network communication unit 835 of the redraw command URL (S106). The network communication unit 835 transmits an HTTP request inclusive of the redraw command URL to the network communication unit 41 of the HTTP server 40 (S107).

Upon receiving the HTTP request from the SDK platform 83, the network communication unit 41 requests the request processing unit 42 to perform a process responsive to the redraw command URL included in this HTTP request (S108). Based on the redraw command URL, the request processing unit 42 supplies a redraw event through the Web browser 30 to the script program 301 included in the HTML data displayed by the Web browser 30 (S109). More specifically, the request processing unit 42 transmits a request to generate a redraw event to the Web browser 30 by use of an inter-process communication. In response to this request, the Web browser 30 enters the redraw event into the script program 301.

The HTTP request transmitted from the network communication unit 835 in step S107 is for the purpose of conveying a redraw command. A response to such an HTTP request has no special significance other than to complete the HTTP communication. Accordingly, the network communication unit 41 may return an HTTP response void of contents or inclusive of dummy HTML data as a response to the HTTP request issued in step S107. This HTTP response may be returned at any timing such as immediately after the request is issued to the request processing unit 42 or after a response is returned from the request processing unit 42.

Having received the redraw event as an input, the script program 301 causes a process defined in the script program 301 to be performed in response to the redraw event. Namely, a request is sent to the network communication unit 32 (S110) to request the acquisition of new HTML data by use of a parameter indicative of a URL of HTML data for redraw (hereinafter referred to as "redraw data URL"). The redraw data URL may be defined in advance in the script program 301, or the redraw command URL may be used as the redraw data URL. Further, the process performed based on the script program 301 in the present embodiment may be performed based on another definition provided in the HTML data.

The network communication unit 32 transmits an HTTP request inclusive of the redraw data URL to the network communication unit 836 of the SDK platform 83 (S111). Upon receiving the HTTP request, the network communication unit 836 performs a process responsive to the redraw data URL included in this HTTP request. Namely, the network communication unit 836 acquires HTML data stored in the screen data storing unit 833 (i.e., the HTML data stored by the HTML generating unit 832 in step S103) (S112, S113). Further, the network communication unit 836 returns an HTTP response inclusive of the HTML data to the network communication unit 32 of the Web browser 30 (S114). The network communication unit 836 deletes the acquired HTML data from the screen data storing unit 833. This is done for the purpose of preventing two or more redraw HTML data from being confused with each other at the time of a subsequent redraw.

Upon receiving the HTTP response, the network communication unit 32 supplies the HTML data included in the HTTP response to the HTML decoding unit 33 (S115). The HTML decoding unit 33 decodes (analyzes) the HTML data, and enters a command to draw a new operation screen into the screen drawing unit 34 based on the definitions provided in the HTML data (S116). The screen drawing unit 34 converts the entered draw command into a format recognizable by the operation panel control unit 272, and enters the converted draw command into the operation panel control unit 272 (S117). In response to the entered draw command, the operation panel control unit 272 draws a new operation screen on the operation panel 14.

In the manner as described above, an update (transition) of an operation screen is performed in response to the SDK application 84 serving as a trigger. In the example illustrated in FIG. 4, the request processing unit 42 notifies the Web browser of a redraw event by use of an inter-process communication. The method of conveying a redraw request is not limited to this example. As described in connection with FIG. 3, for example, a hard key event for causing a redraw may be sent from the request processing unit 42 to the Web browser 30 via the hard key event generating unit 43 and the hard key control unit 271. In this case, the event detecting unit 31 detects the hard key event, and reports the detection to the script program 301.

According to the image forming apparatus 10 of the present embodiment described above, the display state (i.e., displayed screen) of the Web browser 30 may be updated based on an event occurring on the Web-server side (i.e., in the SDK platform 83 or SDK application 84) asynchronously from a request issued from the Web browser 30.

In the present embodiment, a request to update a Web page in response to an asynchronous event is received by the HTTP server 40. There is thus no need for the Web browser 30 to have mechanism to achieve such a function. The above-described arrangement is particularly effective in an environment in which modification to the Web browser 30 is difficult.

In a typical Web system, a Web server (i.e., HTTP server) and a Web browser are connected via a network. The present embodiment may be applied to such a system configuration.

Figure 5:
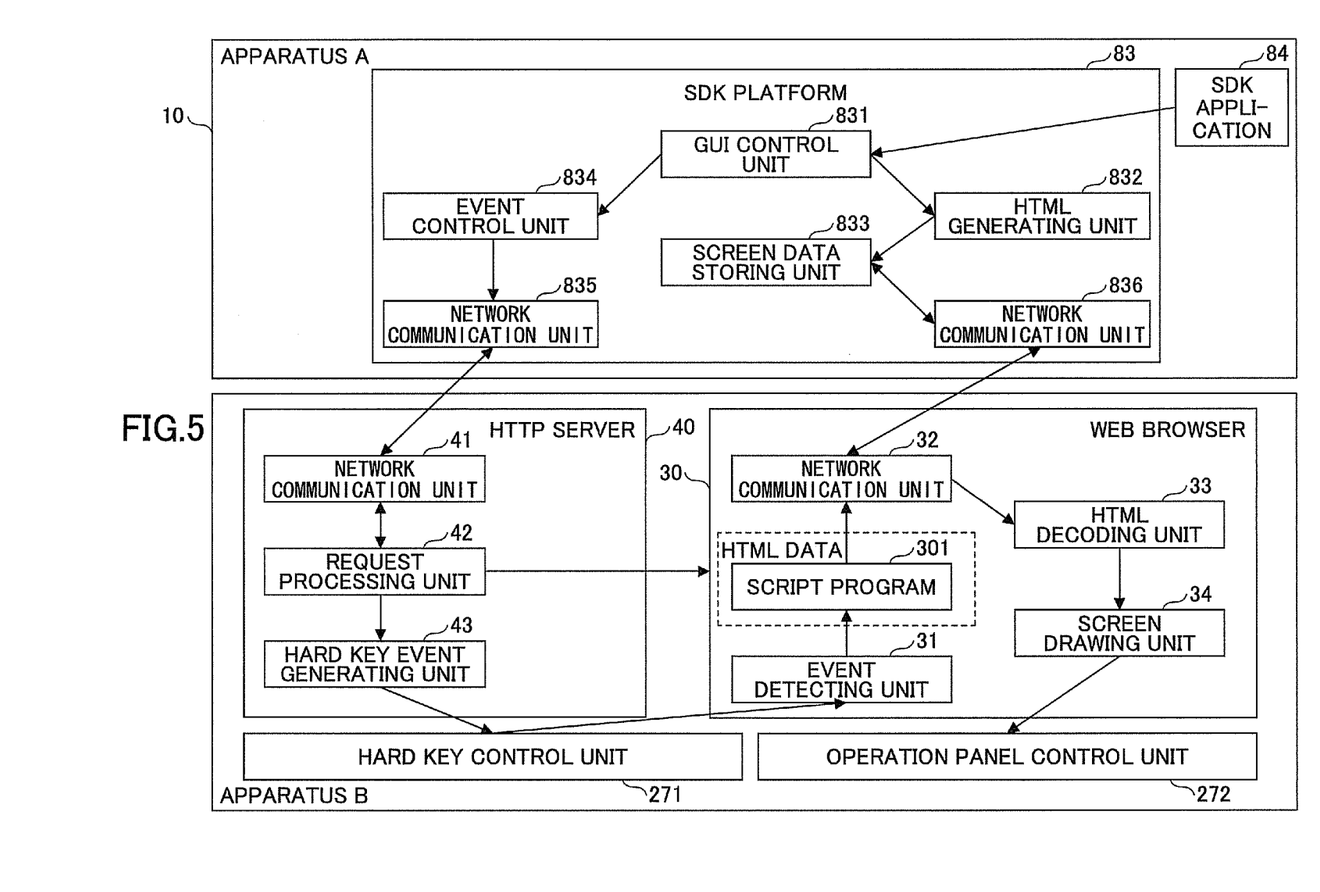
FIG. 5 is a drawing showing an example in which the functions of the above-noted embodiment are distributed to two apparatuses connected through a network.

FIG. 5 is a drawing showing an example in which the functions of the above-described embodiment are distributed to two apparatuses connected through a network. In FIG. 5, the same elements as those of FIG. 3 are referred to by the same numerals, and a description thereof will be omitted.

In FIG. 5, an apparatus A and an apparatus B are connected via a network (either wired or wireless) such as a LAN (Local Area Network) or the Internet. The apparatus A serves as a Web server apparatus, and includes the SDK platform 83 and the SDK application 84. The apparatus B includes the Web browser 30, the HTTP server 40, the hard key control unit 271, and the operation panel control unit 272.

Even when the SDK platform 83 is connected to the HTTP server 40 and the Web browser 30 via a network as shown in this configuration, there is no need to modify each program module. This is because exchanges between the SDK platform 83 and either one of the HTTP server 40 and the Web browser 30 are performed by use of HTTP that is a protocol for network communication.

Further, the present invention is not limited to these embodiments, but various variations and modifications may be made without departing from the scope of the present invention.

The present application is based on Japanese priority application No. 2008-302904 filed on Nov. 27, 2008, with the Japanese Patent Office, the entire contents of which are hereby incorporated by reference.

What is claimed is:

1. A Web page updating method performed by a computer, comprising:
   a Web-page display step of causing a Web page display unit to receive a Web page from a Web page server unit to display the received Web page on a display device;
   an update request wait step of causing an update request wait unit to wait for receipt of an update request to update the displayed Web page; and
   an update request reporting step of reporting the update request to the Web page display unit in response to receipt of the update request by the update request wait unit from the Web server unit,
   wherein the Web page display unit sends a Web page transmission request to the Web server unit based on a definition provided in the displayed Web page in response to the reported update request, and displays on the display device the Web page returned from the Web server unit in response to the Web page transmission request, and
   wherein the Web page updating method further includes:
   a first updating the displayed Web page according to data received in response to a Web page acquisition request according to the update request from the Web-page display unit,
   a second updating the displayed Web page based on data received in response to an updated Web page acquisition request according to a definition included in a notice sent by the Web server unit, and wherein the notice sent by the Web server unit includes a completion of requested process or an occurrence of trouble at the Web server unit,
   wherein the computer includes the Web server unit, and
   wherein the Web server unit performs:
   a Web page acquisition step of generating or acquire a Web page responsive to an event in response to the event that occurs asynchronously from the Web page transmission request issued by the Web page display unit;
   an update request transmission step of transmitting the update request to the update request wait unit; and
   a Web page returning step of returning the Web page generated or acquired by the Web page acquisition step to the Web page display unit in response to the Web page transmission request sent from the Web page display unit.

2. The Web page updating method as claimed in claim 1, wherein the Web page display step includes sending the Web page transmission request to the Web server unit based on a script program included in the displayed Web page.

3. The Web page updating method as claimed in claim 1, wherein the update request wait unit is configured to receive Hyper Text Transfer Protocol (HTTP) request inclusive of a Uniform Resource Locator (URL) indicating the update request from the Web server unit.

4. A non-transitory computer-readable recording medium having a program embodied therein for causing a computer to function as:
   a Web-page display unit configured to receive a Web page from a Web page server unit to display the received Web page on a display device;
   an update request wait unit configured to wait for receipt of an update request to update the displayed Web page; and
   an update request reporting unit configured to report the update request to the Web page display unit in response to receipt of the update request by the update request wait unit from the Web server unit,
   wherein the Web page display unit sends a Web page, transmission request to the Web server unit based on a definition provided in the displayed Web page in response to the reported update request, and displays on the display device the Web page returned from the Web server unit in response to the Web page transmission requests and
   wherein the said program further causes the computer to function as:
   a first update unit configured to update the displayed Web page according to data received in response to a Web page acquisition request according to the update request from the Web-page display unit, and
   a second update unit configured to update the displayed Web page based on data received in response to an updated Web page acquisition request according to a definition included in a notice sent by the Web server unit, and wherein the notice sent by the Web server unit includes a completion of requested process or an occurrence of trouble at the Web server unit,
   wherein the computer is further caused to function as the Web server unit, and
   wherein the Web server unit includes:
   a Web page acquisition unit configured to generate or acquire a Web page responsive to an event in response to the event that occurs asynchronously from the Web page transmission request issued by the Web page display unit;
   an update request transmission unit configured to transmit the update request to the update request wait unit; and
   a Web page returning unit configured to return the Web page generated or acquired by the Web page acquisition unit to the Web page display unit in response to the Web page transmission request sent from the Web page display unit.

5. The non-transitory computer-readable recording medium as claimed in claim 4, wherein the Web page display unit is configured to send the Web page transmission request to the Web server unit based on a script program included in the displayed Web page.

6. The non-transitory computer-readable recording medium as claimed in claim 4, wherein the update request wait unit is configured to receive Hyper Text Transfer Protocol (HTTP) request inclusive of a Uniform Resource Locator (URL) indicating the update request from the Web server unit.

* * * * *